(12) United States Patent
Ito et al.

(10) Patent No.: US 7,982,455 B2
(45) Date of Patent: Jul. 19, 2011

(54) ROLLING BEARING WITH ROTATIONAL SPEED SENSOR

(75) Inventors: Hiroyoshi Ito, Kuwana (JP); Seiichi Takada, Kuwana (JP)

(73) Assignee: NTN Corporation, Osaka (JP)

( * ) Notice: Subject to any disclaimer, the term of this patent is extended or adjusted under 35 U.S.C. 154(b) by 467 days.

(21) Appl. No.: 12/086,642

(22) PCT Filed: Jan. 11, 2007

(86) PCT No.: PCT/JP2007/050229
§ 371 (c)(1),
(2), (4) Date: Jun. 17, 2008

(87) PCT Pub. No.: WO2007/080917
PCT Pub. Date: Jul. 19, 2007

(65) Prior Publication Data
US 2009/0256551 A1 Oct. 15, 2009

(30) Foreign Application Priority Data

Jan. 12, 2006 (JP) ................... 2006-004357
Jan. 12, 2006 (JP) ................... 2006-004407
Jan. 17, 2006 (JP) ................... 2006-008620
Jan. 17, 2006 (JP) ................... 2006-008640
Jan. 19, 2006 (JP) ................... 2006-010792
Jan. 25, 2006 (JP) ................... 2006-016592

(51) Int. Cl.
*G01B 7/30* (2006.01)
(52) U.S. Cl. .................. 324/207.25; 324/174
(58) Field of Classification Search .............. 324/174, 324/207.25; 73/514.31, 514.39
See application file for complete search history.

(56) References Cited

U.S. PATENT DOCUMENTS 6,127,819 A * 10/2000 Ouchi ..................... 324/173
2005/0007226 A1 1/2005 Mizuta

FOREIGN PATENT DOCUMENTS

| JP | 2000-329143 | 11/2000 |
| JP | 2002-295465 | 10/2002 |
| JP | 2002-349556 | 12/2002 |
| JP | 2003-075194 | 3/2003 |
| JP | 2004-138597 | 5/2004 |
| JP | 2005-140797 | 6/2005 |

OTHER PUBLICATIONS

International Search Report issued Apr. 24, 2007 in the International (PCT) Application of which the present application is the U.S. National Stage.

* cited by examiner

*Primary Examiner* — Bot L LeDynh
(74) *Attorney, Agent, or Firm* — Wenderoth, Lind & Ponack, LLP.

(57) ABSTRACT

The object is to produce a magnetic encoder having a large outer diameter at a low cost, provide a sensor case which is compact in size and can be easily mounted and dismounted with a sensor element received therein, and to provide a double row rolling bearing with a preload application device and a rotational speed sensor which comprises a small number of parts and thus can be assembled easily. A magnetic member 12 of the magnetic encoder 11 is made of a magnetic material bound by rubber. The magnetic member 12 is bonded to an annular presser member 8, which also serves as a metal core, by an adhesive 13, thus eliminating the need for a mold and other facilities for vulcanization bonding. This makes it possible to manufacture a magnetic encoder 11 with a large outer diameter at a low cost.

10 Claims, 16 Drawing Sheets

ROLLING BEARING WITH ROTATIONAL SPEED SENSOR

TECHNICAL FIELD

This invention relates to a rolling bearing with a rotational speed sensor.

BACKGROUND ART

Some rolling bearings for supporting e.g. rotary shafts of various rotary devices carry a rotational speed sensor for detecting the rotational speed (number of revolutions per unit time) of the rotary shaft. Such a rolling bearing with a rotational speed sensor includes a magnetic encoder comprising a metal core mounted to one of inner and outer races that rotates, and an annular magnetic member magnetized such that different magnetic poles are alternately arranged in the circumferential direction and fixed to the metal core, and a sensor element fixed to the stationary race for detecting changes in magnetic poles when the magnetic encoder rotates, thereby detecting the rotation of the rotating race.

The magnetic member of the magnetic encoder ordinarily comprises a magnetic material such as a ferrite and a binder such as a thermoplastic resin or rubber. The mixture of the magnetic material and the binder is formed to predetermined dimensions in a mold for e.g. injection molding. The thus formed magnetic member is fixed to the metal core by means of an adhesive or by pressing if the binder is a thermoplastic resin, or fixed to the metal core by vulcanization bonding if the binder is rubber (see JP patent publication 2002-349556A). The thus formed magnetic member is magnetized with a magnetizing device to form a desired number of magnetic poles.

Ordinarily, the sensor element is received in a sensor case mounted to an annular metal core fitted in or on the radially inner or outer surface of the stationary race at its end, and thus is mounted to the stationary race (as disclosed in JP patent publication 2002-295465A). In JP patent publication 2002-295465A, the sensor case is fixed to the metal core by adhesively bonding the former to the latter and engaging a protrusion formed on the metal core in a recess formed in the sensor case. The metal core is pressed into the radially inner surface of the outer race as the stationary race at its end. A substrate for the sensor element is also mounted in the sensor case. On the substrate, electric circuits for processing output signals of the sensor element are often mounted.

In some double row rolling bearings for supporting rotating members of medical devices and robots, in order to prevent vibrations of the rotating member, the inner race comprises two separate portions each having a raceway opposed to one of the two raceways of the outer race, with an axial gap defined therebetween, and an annular presser member is provided on one side of one of the two separate portions of the inner race to reduce the axial gap, thereby applying a preload to the bearing (as disclosed in JP patent publication 2000-329143A). It is preferable to provide such a double row bearing for supporting a rotating member of a medical device or a robot with a rotational speed sensor in order to detect the rotation of the rotating member.

In the arrangement in which the binder in the magnetic member is a thermoplastic resin, in order to manufacture a large-sized bearing having a magnetic encoder having a correspondingly large outer diameter, it is necessary to use a large-sized mold and a large-sized facility for injection molding, which increases the manufacturing cost. In the arrangement in which rubber is used as the binder and the magnetic member is fixed to the metal core by vulcanization bonding, a mold for keeping the magnetic member in contact with the metal core is necessary, and large-sized mold and facility for vulcanization bonding are necessary.

As disclosed in JP patent publication 2002-295465A, because in the sensor case in which the sensor element is mounted, a substrate on which electric circuits for processing output signals of the sensor element is also mounted in many cases, these elements are more likely to fail than the magnetic encoder due e.g. to vibrations. Because in such a rolling bearing with a rotational speed sensor in which the annular metal core to which the sensor case is mounted is pressed into or onto the radially inner or outer surfaces of the stationary race at its end, if the above-described failure occurs, the sensor case cannot be easily removed for repair or exchange. The annular metal core takes up extra space, so that it is difficult to provide a compact bearing.

If the rotational speed sensor disclosed in JP patent publication 2002-349556A is mounted on the double row rolling bearing with a preload application means as disclosed in JP patent publication 2000-329143A, because the double row rolling bearing itself comprises a large number of parts, the addition of the magnetic encoder and the sensor element of the rotational speed sensor excessively increases the number of parts of such a bearing. It is troublesome to assemble such a bearing.

SUMMARY OF THE INVENTION

An object of the present invention is to produce even a magnetic encoder having a large outer diameter at a low cost, provide a sensor case which is compact in size and can be easily mounted and dismounted with a sensor element received therein, and to provide a double row rolling bearing with a preload application means and a rotational speed sensor which comprises a small number of parts and thus can be assembled easily.

In order to achieve this object, the present invention provides a rolling bearing with a rotational speed sensor, comprising inner and outer races, one of the inner and outer races being a rotating race and the other of the inner and outer races being a stationary race, a magnetic encoder mounted to the rotating race and comprising a metal core and an annular magnetic member fixed to the metal core and magnetized such that different magnetic poles are alternately arranged in a circumferential direction thereof, and a sensor element mounted to the stationary race for detecting changes in magnetic poles when the magnetic encoder rotates, thereby detecting the rotation of the rotating race, characterized in that the magnetic member comprises a magnetic material and rubber, the rubber binding the magnetic material, and that the magnetic member is fixed to the metal core by means of an adhesive.

Because the magnetic member of the magnetic encoder comprises a magnetic material and a rubber binding the magnetic material, and the magnetic member is bonded to the metal core by means of an adhesive, no molds or facilities for vulcanization bonding are necessary, so that even a magnetic encoder having a large outer diameter can be manufactured at a low cost. The rubber should be a high-molecular weight compound capable of binding a magnetic material and having elasticity, such as natural rubber or synthetic rubber.

The magnetic member is formed by vulcanization in a mold having such a shape that when formed by vulcanization in the mold, the magnetic member is partially bent such that the area enclosed by the magnetic member in the mold is smaller than the area enclosed by the magnetic member when the magnetic member is mounted on the metal core in an annular shape. With this arrangement, it is possible to use a small-sized mold for vulcanization and further reduce the manufacturing cost.

In an arrangement in which the magnetic member is fixed to an outer periphery of the metal core, the magnetic member preferably has an inner circumference, before being fixed to the metal core, that is shorter than the circumference of the outer periphery of the metal core. With this arrangement, it is possible to strongly fix the magnetic member to the outer periphery of the metal core due to the elasticity of the rubber in the magnetic member By forming a recess in the surface of the metal core to which the magnetic member is fixed, this recess serves as an adhesive reservoir, so that the magnetic member can be more strongly bonded to the metal core.

The present invention also provides a rolling bearing with a rotational speed sensor, comprising inner and outer races, one of the inner and outer races being a rotating race and the other of the inner and outer races being a stationary race, a magnetic encoder mounted to the rotating race and comprising a metal core and an annular magnetic member fixed to the metal core and magnetized such that different magnetic poles are alternately arranged in a circumferential direction thereof, and a sensor element mounted to the stationary race for detecting changes in magnetic poles when the magnetic encoder rotates, thereby detecting the rotation of the rotating race, characterized in that the magnetic member comprises a magnetic material and a thermosetting resin, the thermosetting resin binding the magnetic material.

Because the magnetic member of the magnetic encoder comprises a magnetic material and a thermosetting resin binding the magnetic material, it is possible to eliminate the need for large-scale facilities such as for injection molding, or a mold and other facilities for vulcanization bonding. Thus, it is possible to manufacture even a magnetic encoder having a large outer diameter at a low cost.

In one arrangement, the magnetic encoder is formed by arranging a forming jig such that a gap is present between the surface of the metal core and the jig, placing a raw material containing a magnetic material and a thermosetting resin in the gap, heating the raw material to cure the thermosetting resin, thereby forming the raw material into the magnetic member and simultaneously fixing the magnetic member to the surface of the metal core. With this arrangement, because the raw material is heated only to a low temperature sufficient to cure the thermosetting resin, it is possible to use a forming jig made of e.g. resin, and it is not necessary to use a metal mold or pressurizing facilities that are necessary for vulcanization bonding.

The forming jig is preferably made of silicone rubber so that the raw material containing a magnetic material and a thermosetting resin does not adhere to the forming jig, thereby minimizing the possibility of malformation of the magnetic member.

Preferably, the raw material is heated with a magnetic field applied to the raw material. With this arrangement, it is possible to prevent settling of the magnetic material, which has a high specific gravity, while the thermosetting resin is being thermally cured, thereby forming a magnetic member in which the magnetic material is uniformly dispersed. This improves the accuracy of magnetization when the magnetic member is magnetized, which in turn improves the uniformity of density of the magnetic flux produced from the surface of such a magnetic member.

By magnetizing the magnetic member simultaneously when the magnetic member is formed, it is possible to improve the production efficiency of the magnetic encoder.

From another aspect, the present invention provides a rolling bearing with a rotational speed sensor, comprising inner and outer races, one of the inner and outer races being a rotating race and the other of the inner and outer races being a stationary race, a magnetic encoder mounted to the rotating race and comprising a metal core and an annular magnetic member fixed to the metal core and magnetized such that different magnetic poles are alternately arranged in a circumferential direction thereof, and a sensor element mounted to the stationary race for detecting changes in magnetic poles when the magnetic encoder rotates, thereby detecting the rotation of the rotating race, characterized in that the magnetic member comprises a magnetic material and a thermoplastic resin, the thermoplastic resin binding the magnetic material, and that the magnetic member comprises a plurality of circumferentially divided segments which are fixed to the metal core by means of an adhesive.

Because the magnetic member of the magnetic encoder comprises a magnetic material and a thermoplastic resin binding the magnetic material, and the magnetic member comprises a plurality of circumferentially divided segments which are fixed to the metal core by means of an adhesive, the divided segments can be formed in a small-sized mold and facility. Thus, it is possible to manufacture even a magnetic encoder with a large outer diameter at a low cost.

Each of the segments is preferably formed by injection molding.

Preferably, a gap is provided between circumferentially opposed ends of at least one adjacent pair of the segments, and different magnetic poles are formed at the respective circumferentially opposed ends. By providing such a gap, the divided segments can be pressed against and fixed to the metal core such that any adjacent segments do not overlap with each other. It is also possible to minimize the influence of the turbulence of the magnetic waveform at the position of this gap.

As shown in FIG. 17(b), turbulence occurs in the magnetic waveform at the position of the above gap. But since the gap δ is provided between a north pole and a south pole, this turbulence occurs between a peak and a trough of the waveform and never overshoots either of the thresholds $W_N$ and $W_S$ of the north and south poles, respectively. Thus, such turbulence of the magnetic waveform never influences the detection accuracy of the rotational speed sensor.

In an arrangement in which the segments have circumferential lengths equal to each other, the segments can be formed in a single common mold.

By determining the total number $n_P$ of circumferentially arranged magnetic poles of the magnetic member and the number $n_S$ of the segments such that the ratio $n_P/n_S$ is an integer, at the circumferentially opposed ends of any adjacent segments, different magnetic poles are located. Thus, it is possible to minimize the influence of turbulence of the magnetic waveform at the boundary between any adjacent segments.

A small turbulence also occurs at the boundary between any adjacent segments, where no gap is present. But in this case too, because on both sides of such a boundary, different magnetic poles are present, the turbulence occurs between a peak and a trough of the waveform and never overshoots either of the thresholds $W_N$ and $W_S$ of the north and south poles, respectively. Thus, such turbulence of the magnetic waveform never influences the detection accuracy of the rotational speed sensor.

From still another aspect, the present invention provides a rolling bearing with a rotational speed sensor, comprising inner and outer races, one of the inner and outer races being a rotating race and the other of the inner and outer races being a stationary race, a magnetic encoder mounted to the rotating race and comprising a metal core and an annular magnetic member fixed to the metal core and magnetized such that different magnetic poles are alternately arranged in a circumferential direction thereof, and a sensor element mounted to the stationary race for detecting changes in magnetic poles when the magnetic encoder rotates, thereby detecting the rotation of the rotating race, characterized in that the magnetic member comprises a magnetic material bonded to the surface of a substrate by thermal spraying.

Because the magnetic member of the magnetic encoder comprises a magnetic material bonded to the surface of a substrate by thermal spraying, it is possible to eliminate the need for a mold or other facilities for molding or vulcanization bonding. Thus, it is possible to manufacture even a magnetic encoder with a large outer diameter at a low cost.

The magnetic material may be a ferrite, of which the major component is inexpensive iron oxide.

The magnetic material may be a rare earth material such as Sm—Co or Nd—Fe—B type.

The magnetic material may be an Alnico material, of which aluminum, nickel, cobalt and iron are major components.

By mounting the sensor element in a sensor case, positioning the sensor case relative to the stationary race at two points, and fixing the sensor case to the stationary race by engaging a screw into a tapping hole formed in the stationary race, it is possible to reduce the size of the sensor case, and easily mount and dismount the sensor case without the need for an annular metal core for mounting the sensor case.

Preferably, at least one of two means each for positioning the sensor case at one of the two points relative to the stationary race comprises a pin hole and a pin-shaped protrusion engaged in the pin hole. With this arrangement, it is possible to easily and accurately position the sensor case relative to the stationary race.

By forming the pin hole in the stationary race so that the pin hole has a diameter equal to the diameter of the tapping hole before tapping, it is possible to form the pin hole and the tapping hole efficiently in a short time with a single drill bit.

By mounting the sensor element in a sensor case, positioning the sensor case by means of a radially inner surface of a flange formed on the stationary race or a radially outer surface of a shoulder of the stationary race, and fixing the sensor case to the stationary race by engaging a screw into a tapping hole formed in the stationary race, it is possible to reduce the size of the sensor case, and easily mount and dismount the sensor case without the need for an annular metal core for mounting the sensor case.

By fixing the sensor case to the stationary race by means of a single screw, it is possible to easily mount and dismount the sensor case to and from the stationary race in a short time.

In the case in which the stationary race is formed with two raceways, the rotating race comprises two separate portions each formed with a raceway opposing one of the two raceways of the stationary race, and an axial gap is defined between the two separate portions, the rolling bearing further comprising an annular presser member provided on one side of one of the two separate portions for pressing the one of the two separate portions, thereby reducing the axial gap and applying a preload to the bearing, the presser member having a function as the metal core, it is possible to eliminate the need for a separate metal core for an encoder, thereby reducing the number of parts of the double row rolling bearing with a preload application means and a rotational speed sensor. Thus, the bearing can be assembled more easily.

By forming the raceway of the one of the two separate portions of the rotating race on one of the radially inner and outer surfaces of the one of the two separate portions, and providing the annular presser member with a tubular portion that are fitted on or in the other of the radially inner and outer surfaces, it is possible to easily hold the magnetic encoder in such a position that it radially opposes the sensor element with a very small gap therebetween.

In the rolling bearing with a rotational speed sensor according to the present invention, because the magnetic member of the magnetic encoder comprises a magnetic material and a rubber binding the magnetic material, and the magnetic member is bonded to the metal core by means of an adhesive, no molds or facilities for vulcanization bonding are necessary, so that even a magnetic encoder having a large outer diameter can be manufactured at a low cost.

The magnetic member is formed by vulcanization in a mold having such a shape that when formed by vulcanization in the mold, the magnetic member is partially bent such that the area enclosed by the magnetic member in the mold is smaller than the area enclosed by the magnetic member when the magnetic member is mounted on the metal core in an annular shape. With this arrangement, it is possible to use a small-sized mold for vulcanization and further reduce the manufacturing cost.

In an arrangement in which the magnetic member is fixed to an outer periphery of the metal core, the magnetic member preferably has an inner circumference, before being fixed to the metal core, that is shorter than the circumference of the outer periphery of the metal core. With this arrangement, it is possible to strongly fix the magnetic member to the outer periphery of the metal core due to the elasticity of the rubber in the magnetic member By forming a recess in the surface of the metal core to which the magnetic member is fixed, this recess serves as an adhesive reservoir, so that the magnetic member can be more strongly bonded to the metal core.

In another rolling bearing with a rotational speed sensor according to the present invention, because the magnetic member of the magnetic encoder comprises a magnetic material and a thermosetting resin binding the magnetic material, it is possible to eliminate the need for large-scale facilities such as for injection molding, or a mold and other facilities for vulcanization bonding. Thus, it is possible to manufacture even a magnetic encoder having a large outer diameter at a low cost.

In one arrangement, the magnetic encoder is formed by arranging a forming jig such that a gap is present between the surface of the metal core and the jig, placing a raw material containing a magnetic material and a thermosetting resin in the gap, heating the raw material to cure the thermosetting resin, thereby forming the raw material into the magnetic member and simultaneously fixing the magnetic member to the surface of the metal core. With this arrangement, it is possible to use a forming jig made of e.g. resin, and it is not necessary to use a metal mold or pressurizing facilities that are necessary for vulcanization bonding.

The forming jig is preferably made of silicone rubber so that the raw material containing a magnetic material and a thermosetting resin does not adhere to the forming jig, thereby minimizing the possibility of malformation of the magnetic member.

Preferably, the raw material is heated with a magnetic field applied to the raw material. With this arrangement, it is possible to form a magnetic member in which the magnetic material is uniformly dispersed. This improves the accuracy of magnetization when the magnetic member is magnetized, which in turn improves the uniformity of density of the magnetic flux produced from the surface of such a magnetic member.

By magnetizing the magnetic member simultaneously when the magnetic member is formed, it is possible to improve the production efficiency of the magnetic encoder.

In still another rolling bearing with a rotational speed sensor according to the present invention, because the magnetic member of the magnetic encoder comprises a magnetic material and a thermoplastic resin binding the magnetic material, and the magnetic member comprises a plurality of circumferentially divided segments which are fixed to the metal core by means of an adhesive, the divided segments can be formed in a small-sized mold and facilities. Thus, it is possible to manufacture even a magnetic encoder with a large outer diameter at a low cost.

Preferably, a gap is provided between circumferentially opposed ends of at least one adjacent pair of the segments, and different magnetic poles are formed at the respective circumferentially opposed ends. By providing such a gap, the divided segments can be pressed against and fixed to the metal core such that any adjacent segments do not overlap with each other. It is also possible to minimize the influence of the turbulence of the magnetic waveform at the position of this gap.

In an arrangement in which the segments have circumferential lengths equal to each other, the segments can be formed in a single common mold.

By determining the total number $n_P$ of circumferentially arranged magnetic poles of the magnetic member and the number $n_S$ of the segments such that the ratio $n_P/n_S$ is an integer, at the circumferentially opposed ends of any adjacent segments, different magnetic poles are located. Thus, it is possible to minimize the influence of turbulence of the magnetic waveform at the boundary between any adjacent segments.

In yet another rolling bearing with a rotational speed sensor according to the present invention, because the magnetic member of the magnetic encoder comprises a magnetic material bonded to the surface of a substrate by thermal spraying, it is possible to eliminate the need for a mold or other facilities for molding or vulcanization bonding. Thus, it is possible to manufacture even a magnetic encoder with a large outer diameter at a low cost.

By mounting the sensor element in a sensor case, positioning the sensor case relative to the stationary race at two points, and fixing the sensor case to the stationary race by engaging a screw into a tapping hole formed in the stationary race, it is possible to reduce the size of the sensor case, and easily mount and dismount the sensor case without the need for an annular metal core for mounting the sensor case.

Preferably, at least one of two means each for positioning the sensor case at one of the two points relative to the stationary race comprises a pin hole and a pin-shaped protrusion engaged in the pin hole. With this arrangement, it is possible to easily and accurately position the sensor case relative to the stationary race.

By forming the pin hole in the stationary race so that the pin hole has a diameter equal to the diameter of the tapping hole before tapping, it is possible to form the pin hole and the tapping hole efficiently in a short time with a single drill bit.

By mounting the sensor element in a sensor case, positioning the sensor case by means of a radially inner surface of a flange formed on the stationary race or a radially outer surface of a shoulder of the stationary race, and fixing the sensor case to the stationary race by engaging a screw into a tapping hole formed in the stationary race, it is possible to reduce the size of the sensor case, and easily mount and dismount the sensor case without the need for an annular metal core for mounting the sensor case.

By fixing the sensor case to the stationary race by means of a single screw, it is possible to easily mount and dismount the sensor case to and from the stationary race in a short time.

In the case in which the stationary race is formed with two raceways, the rotating race comprises two separate portions each formed with a raceway opposing one of the two raceways of the stationary race, and an axial gap is defined between the two separate portions, the rolling bearing further comprising an annular presser member provided on one side of one of the two separate portions for pressing the one of the two separate portions, thereby reducing the axial gap and applying a preload to the bearing, the presser member having a function as the metal core, it is possible to eliminate the need for a separate metal core for an encoder, thereby reducing the number of parts of the double row rolling bearing with a preload application means and a rotational speed sensor. Thus, the bearing can be assembled more easily.

By forming the raceway of the one of the two separate portions of the rotating race on one of the radially inner and outer surfaces of the one of the two separate portions, and providing the annular presser member with a tubular portion that are fitted on or in the other of the radially inner and outer surfaces, it is possible to easily hold the magnetic encoder in such a position that it radially opposes the sensor element with a very small gap therebetween.

DETAILED DESCRIPTION OF THE INVENTION

Figure 1:
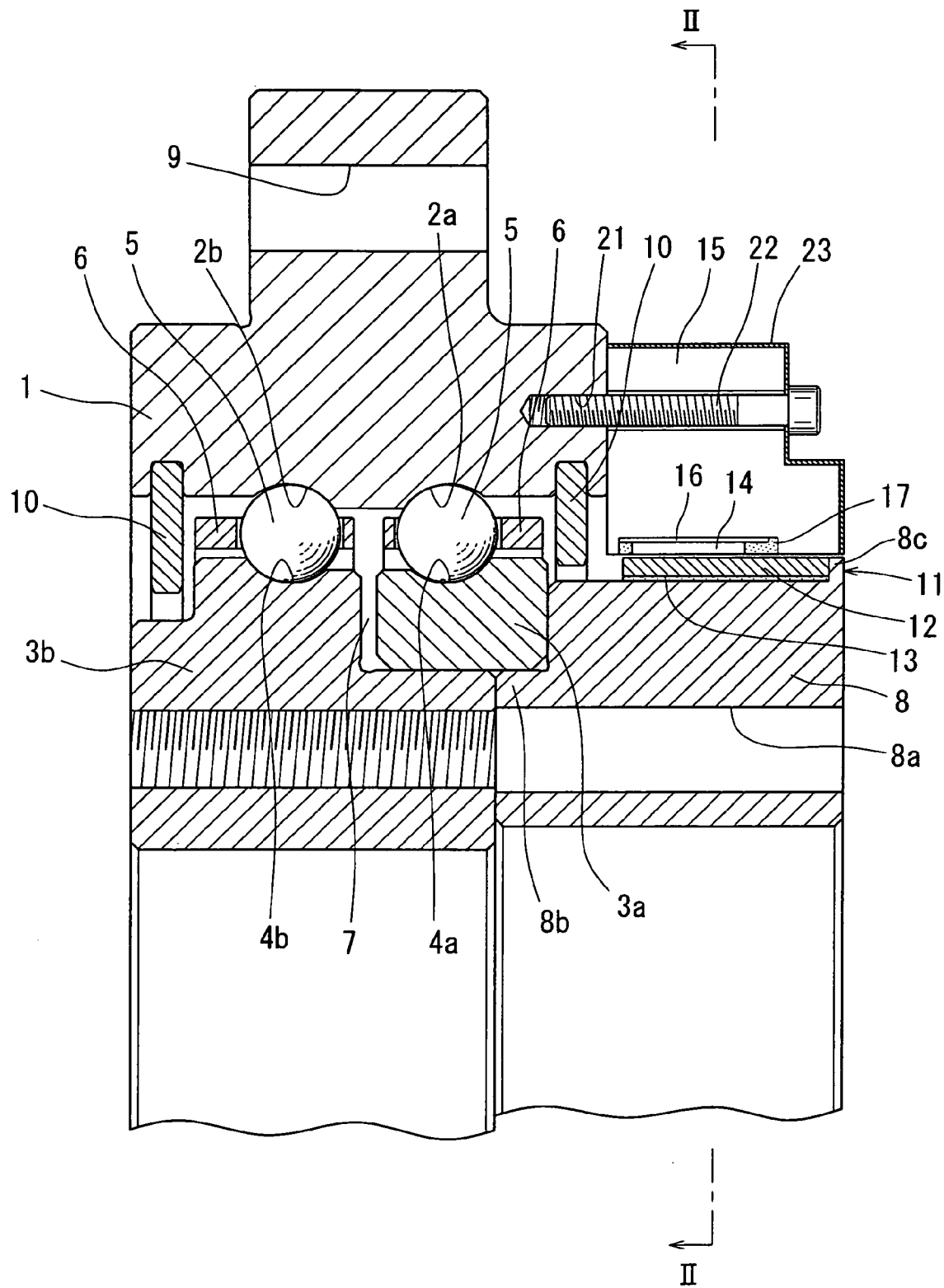
FIG. 1 is a vertical sectional view of a rolling bearing with a rotational speed sensor according to a first embodiment.

Now the embodiments of the invention are described with reference to the drawings. First, the rolling bearing with a rotational speed sensor according to the first embodiment, shown in FIGS. 1 to 4, is a double row ball bearing comprising, as shown in FIG. 1, a stationary outer race 1 having two raceways 2a and 2b formed in the radially inner surface thereof, two separate rotating inner races 3a and 3b having raceways 4a and 4b formed on the radially outer surfaces of the respective inner races 3a and 3b so as to radially oppose the respective raceways 2a and 2b of the outer race 1, and two rows of balls 5 as rolling elements retained by a retainer 6 with the respective rows of balls 5 disposed between the raceways 2a and 2b of the outer race 1 and the raceways 4a and 4b of the inner races 3a and 3b. The inner race 3b has a small-diameter outer surface on which the other inner race 3a is fitted with an axial gap 7 present therebetween. A preload that tends to reduce this gap 7 is applied to the bearing by an annular presser member 8 pressed against the inner race 3a. The outer race 1 has a radially outer portion formed with bolt holes 9 through which bolts are inserted to fix the outer race to e.g. a housing. Seals 10 are mounted to the radially inner surface of the outer race 1 near the respective ends thereof to seal the bearing internal space.

Figure 2A:
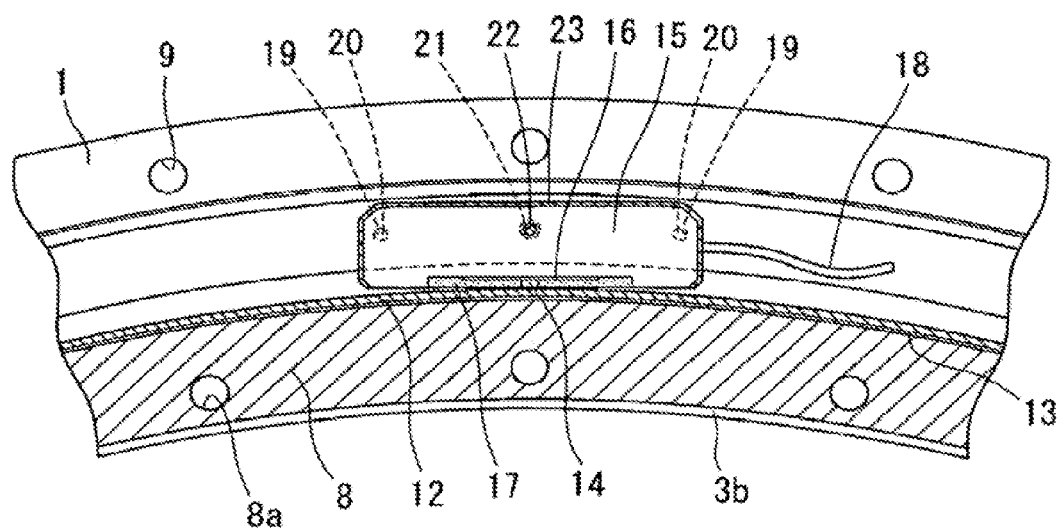
FIG. 2(a) is a sectional view taken along line II-II of FIG. 1.
Figure 2B:
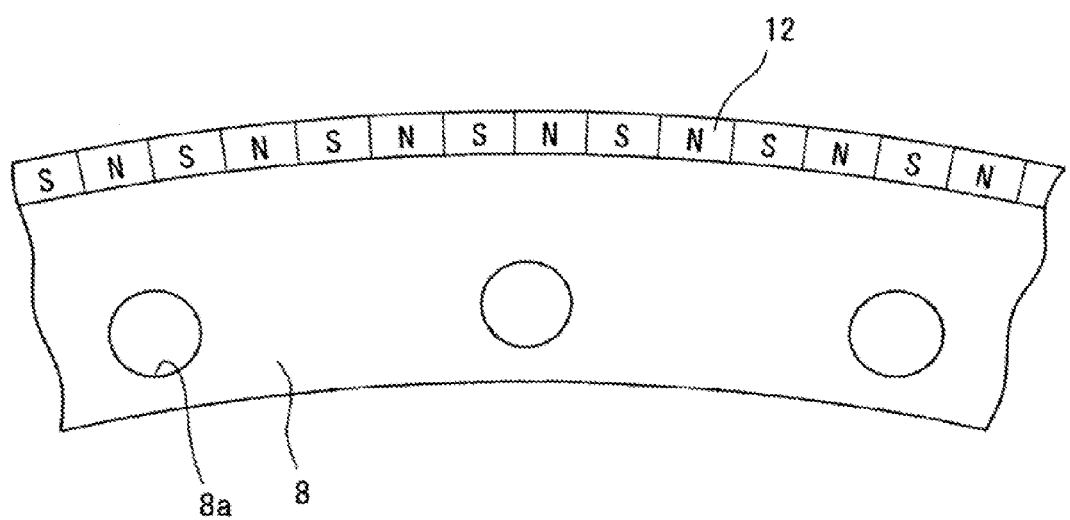
FIG. 2(b) is a schematic side view of a magnetic member showing how it is magnetized.

As shown in FIGS. 1 and 2(a), the presser member 8 is formed with bolt holes 8a. By tightening bolts inserted through the bolt holes 8a, the presser member 8 is pressed against the side surface of the inner race 3a, so that the inner race 3a is pushed toward the inner race 3b to reduce the axial gap 7, thereby applying a preload to the bearing. The presser member 8 constitutes a metal core of a magnetic encoder 11 forming the rotational speed sensor. The magnetic encoder 11 includes an annular magnetic member 12 secured to the radially outer surface of the presser member 8 (i.e., the magnetic core of the magnetic encoder 11) by means of an adhesive 13. A tubular portion 8b extends axially from the inner end surface of the presser member 8 and is fitted in the radially inner surface of the inner race 3a, thereby positioning the axis of the magnetic encoder 11. A flange 8c is provided on the radially outer surface of the presser member 8 at its outer end to axially position the magnetic member 12 of the magnetic encoder 11. As shown in FIG. 2(b), the magnetic member 12 of the magnetic encoder 11 is magnetized such that a predetermined number of north poles and south poles are alternately arranged in the circumferential direction.

Figure 3A:
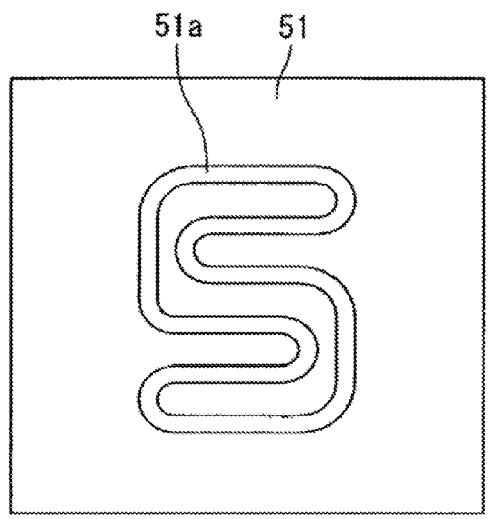
FIG. 3(a) is a plan view of a mold for forming the magnetic member of FIG. 1 by vulcanization.
Figure 3B:
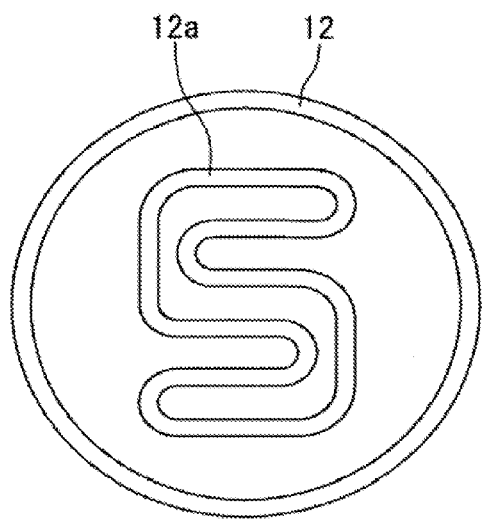
FIG. 3(b) is a plan view of the magnetic member when formed in the mold and after being fixed.

The magnetic member 12 comprises a magnetic material bound by rubber. The magnetic member 12 is formed by pouring a magnetic material and rubber as a binder into a winding endless recess 51a formed in a mold 51 shown in FIG. 3(a) and vulcanizing the mixture. As shown in FIG. 3(b), the area enclosed by the magnetic member 12a when vulcanized in the recess 51a is smaller than the area enclosed by the magnetic member 12 when mounted on the annular outer surface of the presser member 8. Thus, even the magnetic member 12 for a magnetic encoder 11 having a large outer diameter can be formed in a small mold 51 and thus at a low production cost.

The rubber used as the binder is preferably nitrile rubber (NBR), hydrogenated nitrile rubber (H-NBR), acrylic rubber (ACM), ethylene acrylic rubber (AEM) or fluororubber (FKM). The magnetic material may be made of one of ferrites, rare earths such as Sm—Co and Nd—Fe—B types, and Alnico types of which the major components are aluminum, nickel, cobalt and iron. The content of the magnetic material is preferably not less than 70% by mass and not more than 95% by mass, more preferably not less than 75% by mass and not more than 90% by mass.

The magnetic member 12a when vulcanized has an inner circumference that is smaller than the outer circumference of the annular presser member 8. Thus, when the magnetic member 12 is fitted on the outer periphery of the presser member 8, the magnetic member 12 is slightly stretched. With this arrangement, due to the elasticity of the rubber forming the magnetic member 12, the magnetic member 12 can be strongly and reliably secured to the outer periphery of the presser member 8. Preferably, the magnetic member 12a has an inner circumference that is not less than 0.5 times and less than 1.0 times the outer circumference of the presser member 8, more preferably not less than 0.7 times and not more than 0.98 times, further preferably not more than 0.95 times the outer circumference of the presser member 8.

Figure 4:
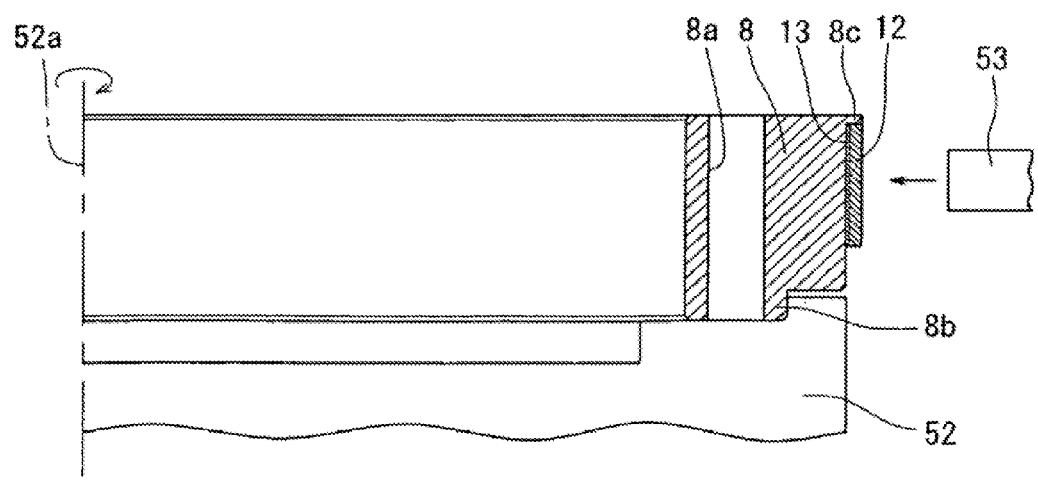
FIG. 4 is a vertical sectional view showing how the magnetic member is finished with the magnetic member fixed to a presser member which also serves as a metal core.

As shown in FIG. 4, with the magnetic member 12 fixed to the outer periphery of the presser member 8, its tubular portion 8b is fixed to a centering table 52 that rotates about a central axis 52a. In this state, the outer periphery of the magnetic member 12 is ground-finished with a cutting tool 53 to a predetermined outer diameter. Then, with the presser member 8 fixed to the centering table 52, the magnetic member 12 is magnetized with a separate magnetizing device such that north and south poles are alternately arranged in the circumferential direction as shown in FIG. 2(b). Preferably, the magnetic member 12 has a thickness of not less than 0.5 mm and not more than 10 mm, more preferably not less than 0.7 mm and not more than 3 mm. Instead of separately carrying out the magnetizing step and the finishing step, the centering table 52 for finishing may also be used for magnetizing, thereby simplifying the manufacturing steps and also improving the accuracy of magnetization.

As shown in FIGS. 1 and 2(a), a sensor element 14 is mounted in a sensor case 15 and is fixed in position together with its substrate 16 in a molding resin 17. An output cable 18 is connected to the substrate 16 through which the rotational speed of the inner races 3a and 3b as detected by the sensor element 14 is transmitted. The substrate 16 is a flexible substrate formed of a film, or one made of epoxy resin. Electric circuits for processing output signals from the sensor element 14 are mounted thereon.

The sensor case 15 has pin-shaped protrusions 20 formed on its side surface near the respective circumferential ends thereof. The pin-shaped protrusions 20 are engaged in two circumferentially spaced pin holes 19 formed in the end surface of the outer race 1, respectively, thereby keeping the sensor case 15 in position such that the sensor element 14 faces the magnetic member 12 of the magnetic encoder 11 with a predetermined sensing gap present therebetween. The sensor case 15 also has its central portion fixed to the outer race by threading a screw 22 into a tapping hole 21 formed in the end surface of the outer race 1. The pin holes 19 have a diameter equal to the tapping hole 21 before tapping so that the holes 19 and 21 can be formed efficiently in a short period of time with a single drill bit.

A metal cover 23 is put on the radially outer surface and the outer side surface of the sensor case 15 to prevent malfunction of the sensor element 14 under the influence of external magnetic fields. The metal cover 23 can be formed by pressing a magnetic material such as a ferrite stainless steel sheet or a soft steel sheet. The cover 23 is preferably integrally fixed to the sensor case 15. Alternatively, the metal cover 23 may be made of a nonmagnetic material and subjected to surface treatment with a magnetic material.

Figure 5:
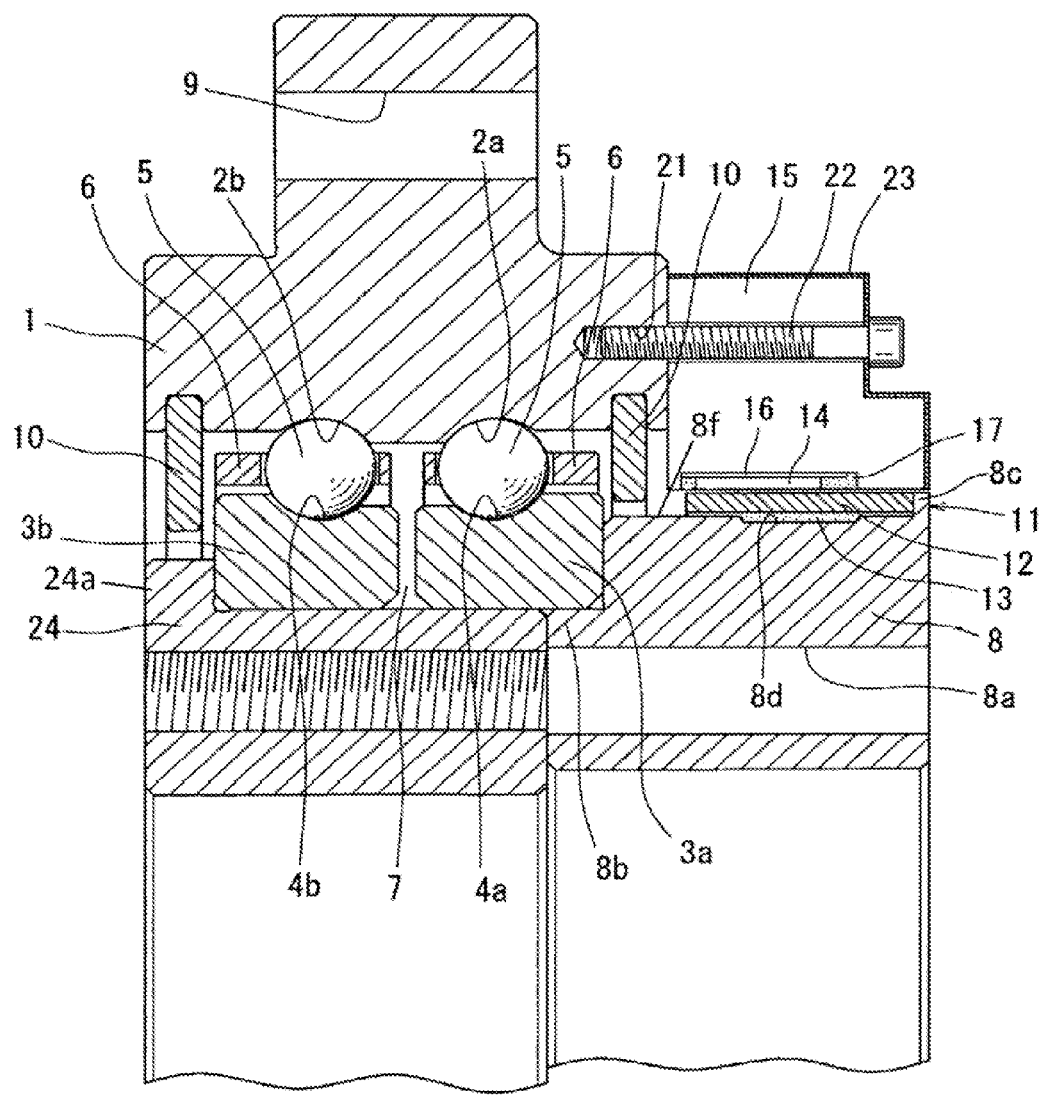
FIG. 5 is a vertical sectional view of a first modified example of the rolling bearing with a rotational speed sensor according to the first embodiment.

FIG. 5 shows a first modified example of the first embodiment. The first modified example differs from the first embodiment in that the split inner races 3a and 3b are fitted on the radially outer surface of a separate inner member 24 with an axial gap 7 left therebetween, that the inner race 3b is axially positioned by a shoulder 24a of the inner member, and that a recess 8d as an adhesive reservoir is formed in the outer periphery (i.e., in a magnetic member-receiving surface 8f) of the presser member 8, which also serves as a metal core of the magnetic encoder 11. The recess 8d as an adhesive reservoir prevents adhesive 13 from being pushed out of the space between the outer periphery of the presser member 8 and the inner periphery of the magnetic member 12 when the magnetic member 12, which has an inner circumference smaller than the outer circumference of the presser member 8, is bonded to the outer periphery of the presser member 8, thereby preventing poor bonding therebetween. As illustrated in FIG. 5, the recess 8d has a width (i.e., dimension in the axial direction of the rolling bearing) located entirely within the width of the magnetic member 12. Also, as illustrated, the adhesive 13 is present between the metal core 8 and the magnetic member 12 not only in the recess 8d, but also between the surfaces of the metal core 8 and the magnetic member 12 where the recess 8d is not formed. The recess 8d shown is a groove that extends the entire circumference of the presser member 8. But instead, a plurality of circumferentially spaced recesses may be formed in the outer periphery of the presser member as the adhesive reservoir.

Figure 6:
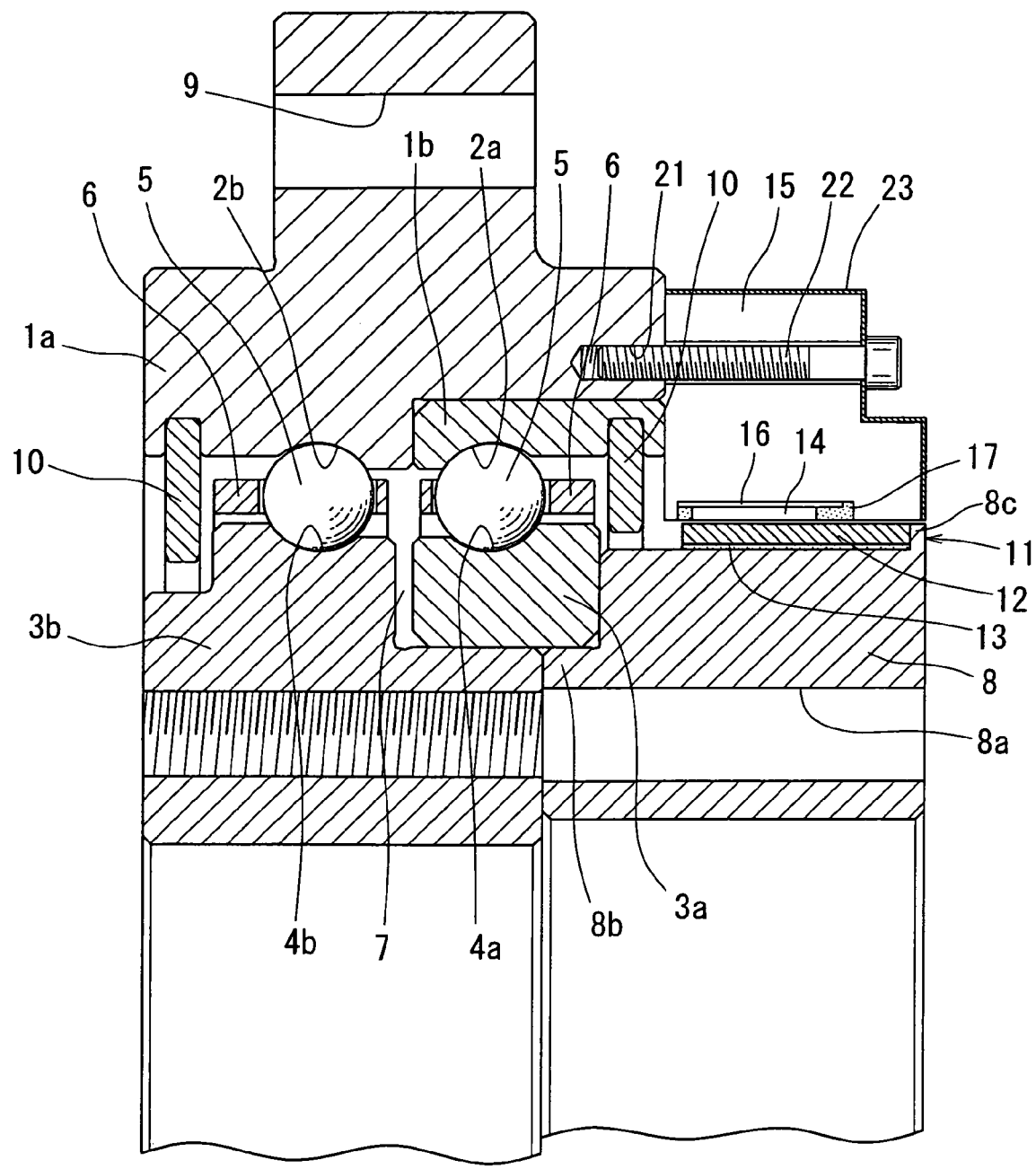
FIG. 6 is a vertical sectional view of a second modified example of the rolling bearing with a rotational speed sensor according to the first embodiment.

FIG. 6 shows a second modified example of the first embodiment. The second modified example differs from the first embodiment in that it includes two split outer races 1a and 1b, of which the outer race 1b, which is formed with the raceway 2a, is fitted in a large-diameter surface of the outer race 1a, which is formed with the bolt holes 9, and that the sensor case 15 is fixed to the end surface of the outer race 1b with the screw 22 to prevent separation of the outer race 1a.

Figure 7:
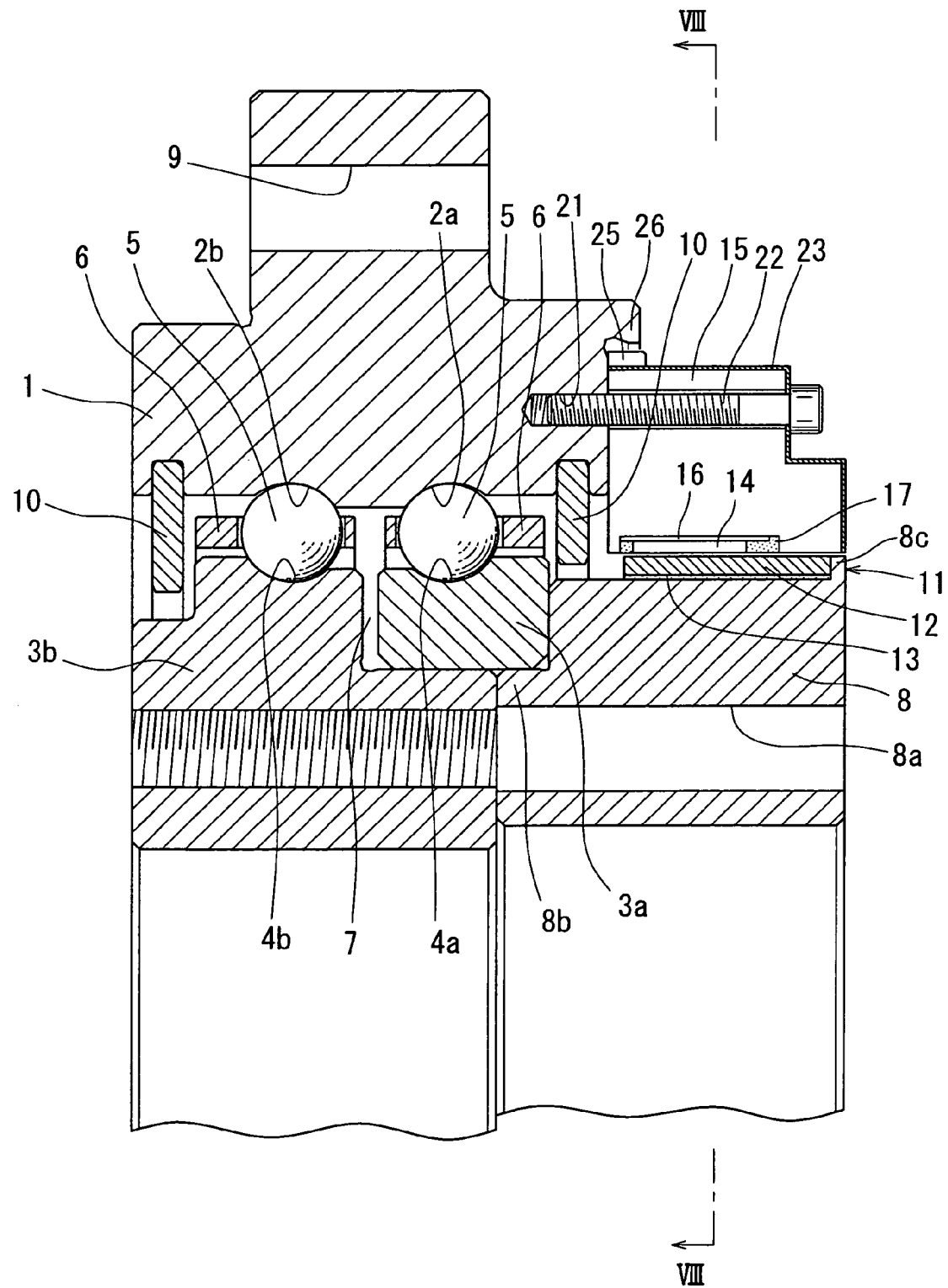
FIG. 7 is a vertical sectional view of a third modified example of the rolling bearing with a rotational speed sensor according to the first embodiment.
Figure 8:
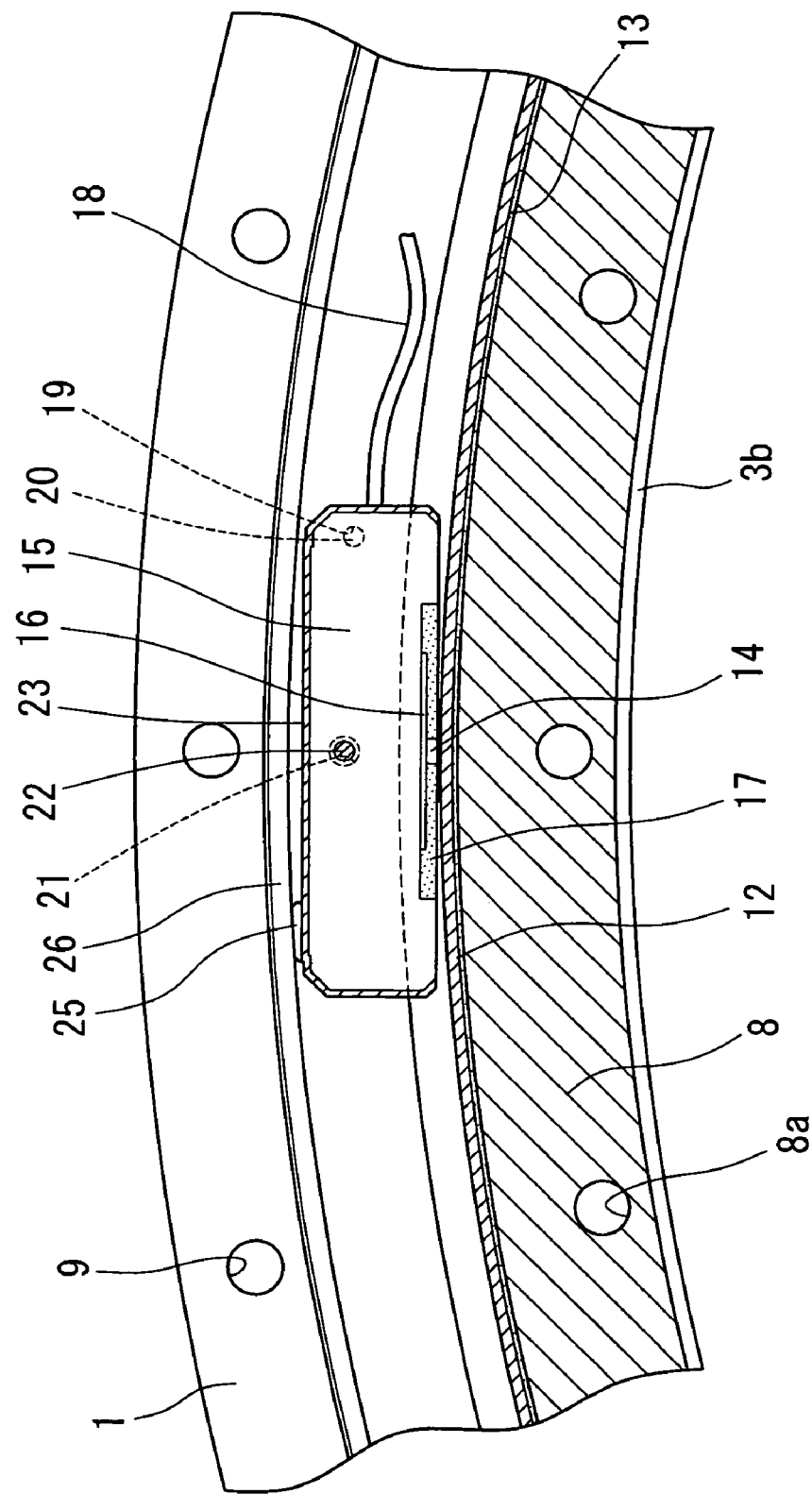
FIG. 8 is a sectional view taken along line VIII-VIII of FIG. 7.

FIGS. 7 and 8 show a third modified example of the first embodiment. The third modified example differs from the first embodiment in that the sensor case 15 has, for positioning thereof, a pin-shaped protrusion 20 on its side surface near one circumferential end thereof which is engaged in a pin hole 19 formed in the end surface of the outer race 1, and a protrusion 25 provided at the other circumferential end and pressed against the radially inner surface of a flange 26 provided on the end surface of the outer race 1.

Figure 9:
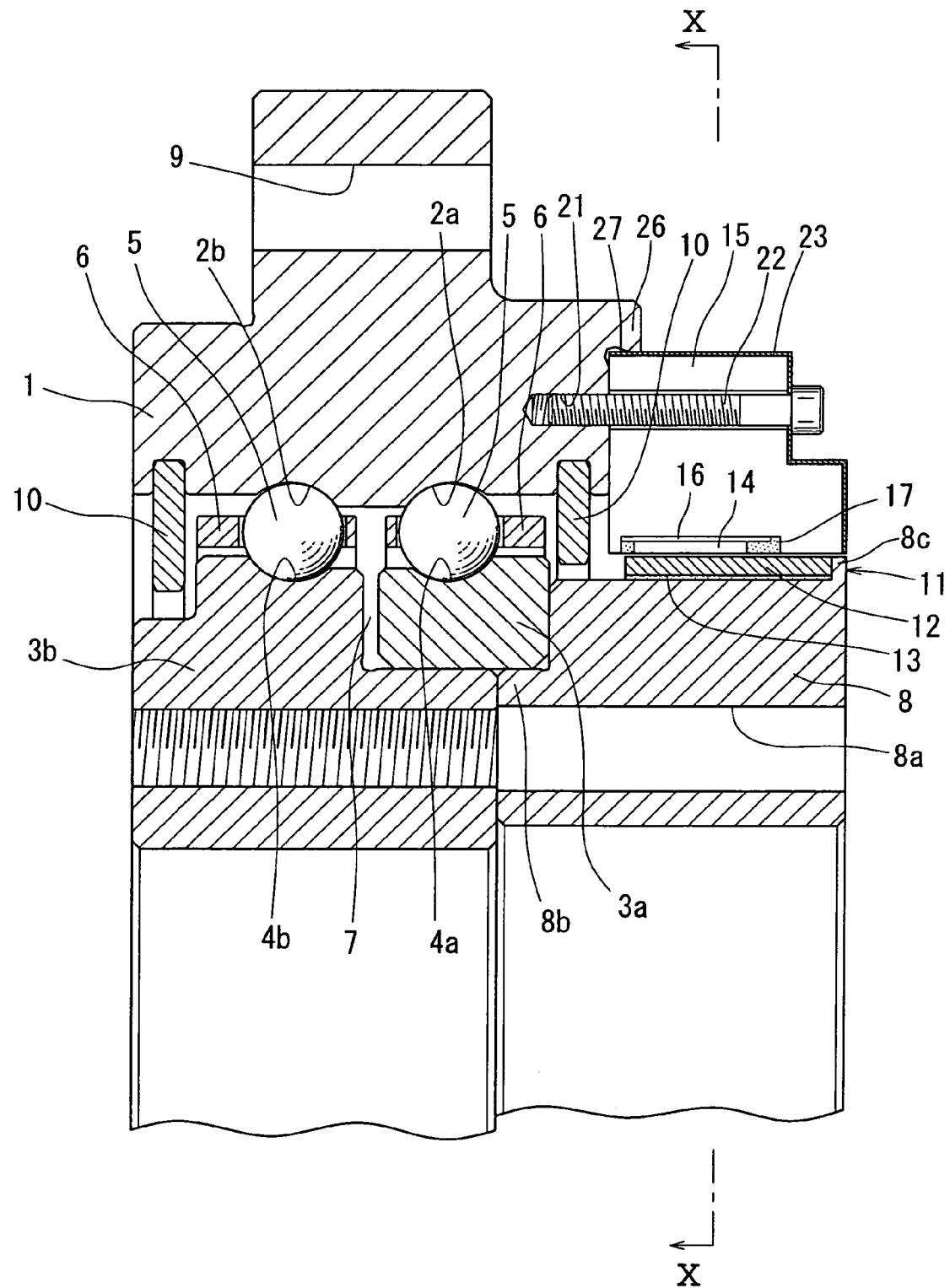
FIG. 9 is a vertical sectional view of a fourth modified example of the rolling bearing with a rotational speed sensor according to the first embodiment.
Figure 10:
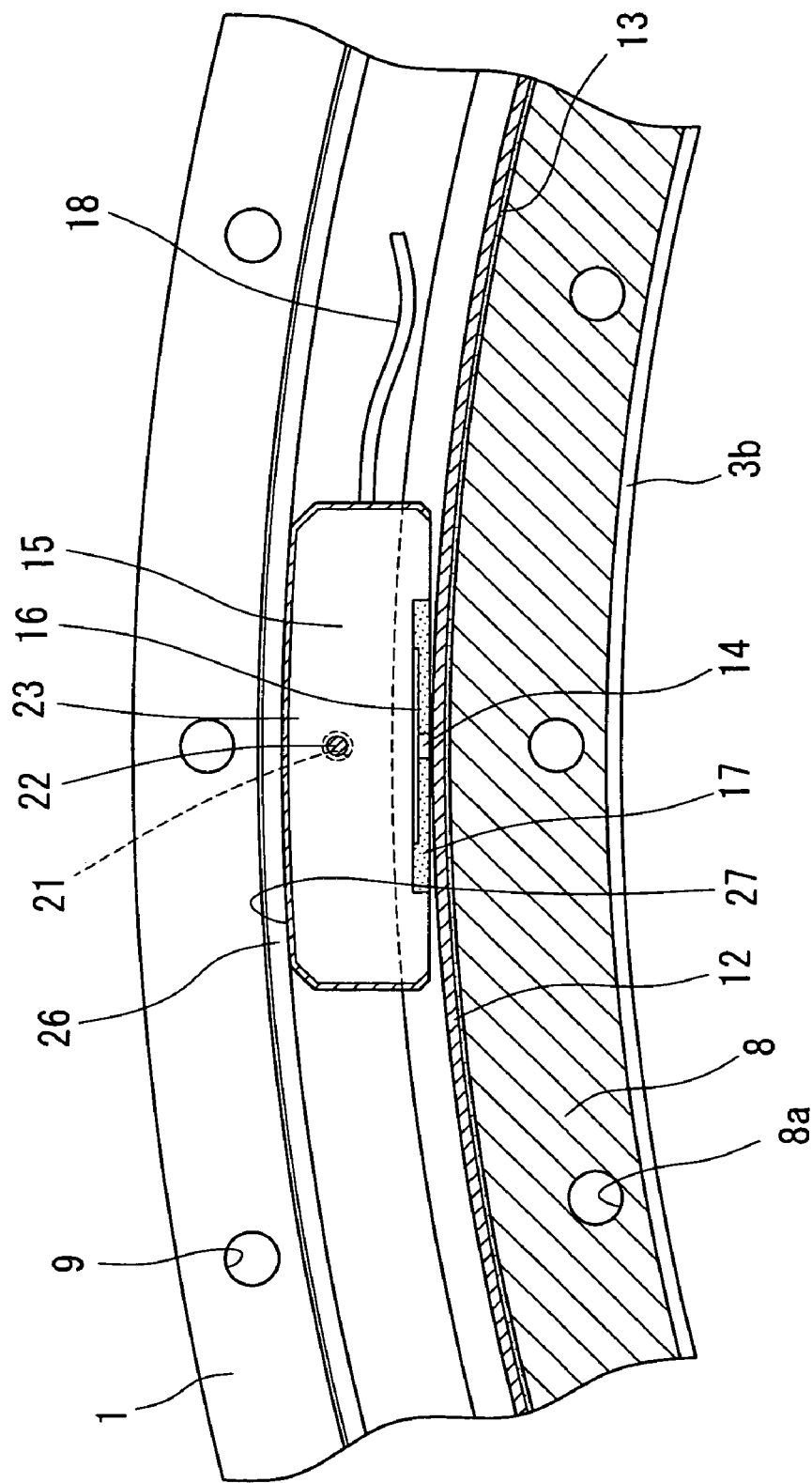
FIG. 10 is a sectional view taken along line X-X of FIG. 9.

FIGS. 9 and 10 show a fourth modified example of the first embodiment. The fourth modified example differs from the first embodiment in that the sensor case 15 is kept in position by supporting its arcuate radially outer surface 27 along the radially inner surface of a flange 26 provided on the end surface of the outer race 1.

Figure 11:
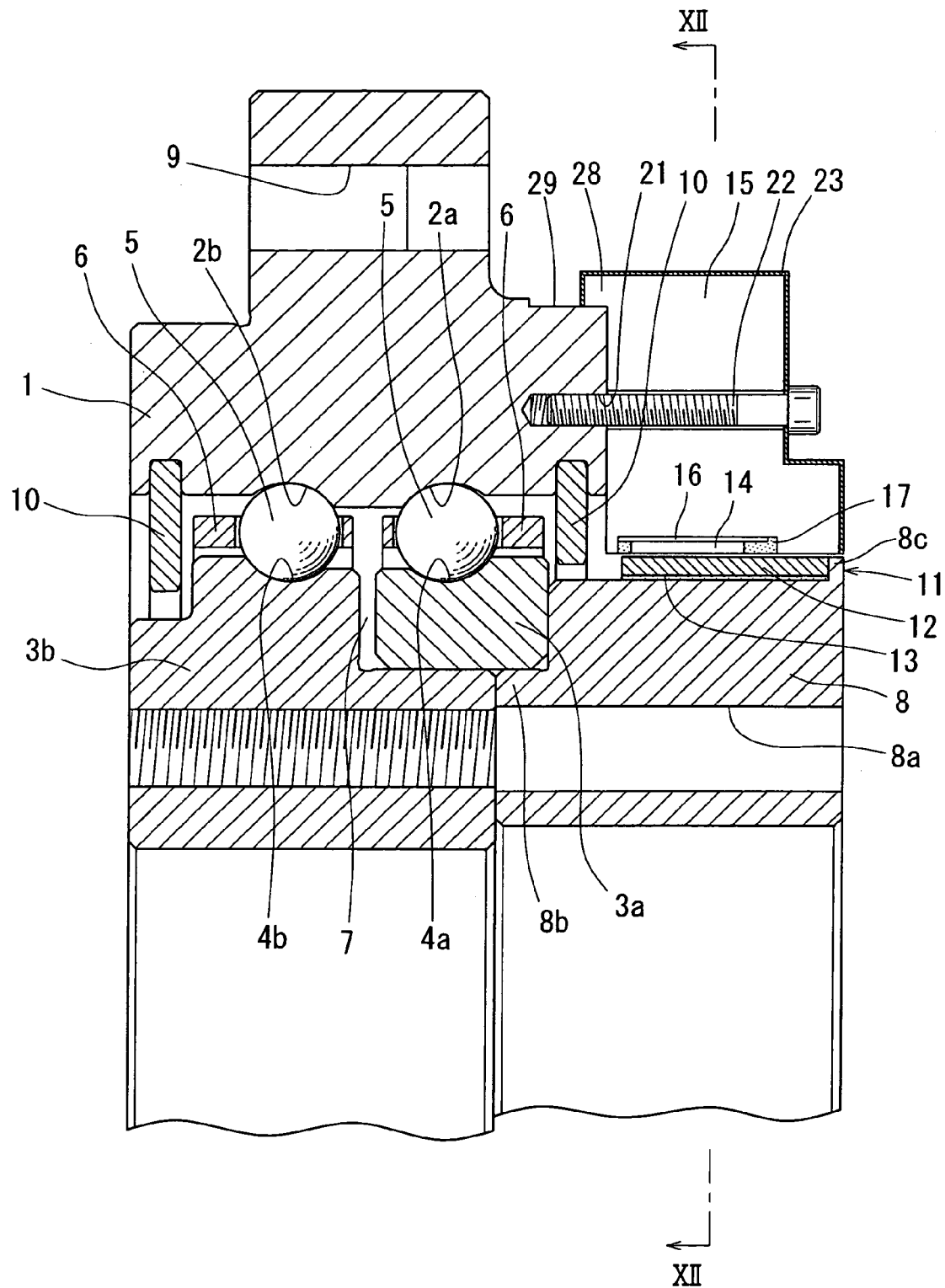
FIG. 11 is a vertical sectional view of a fifth modified example of the rolling bearing with a rotational speed sensor according to the first embodiment.
Figure 12:
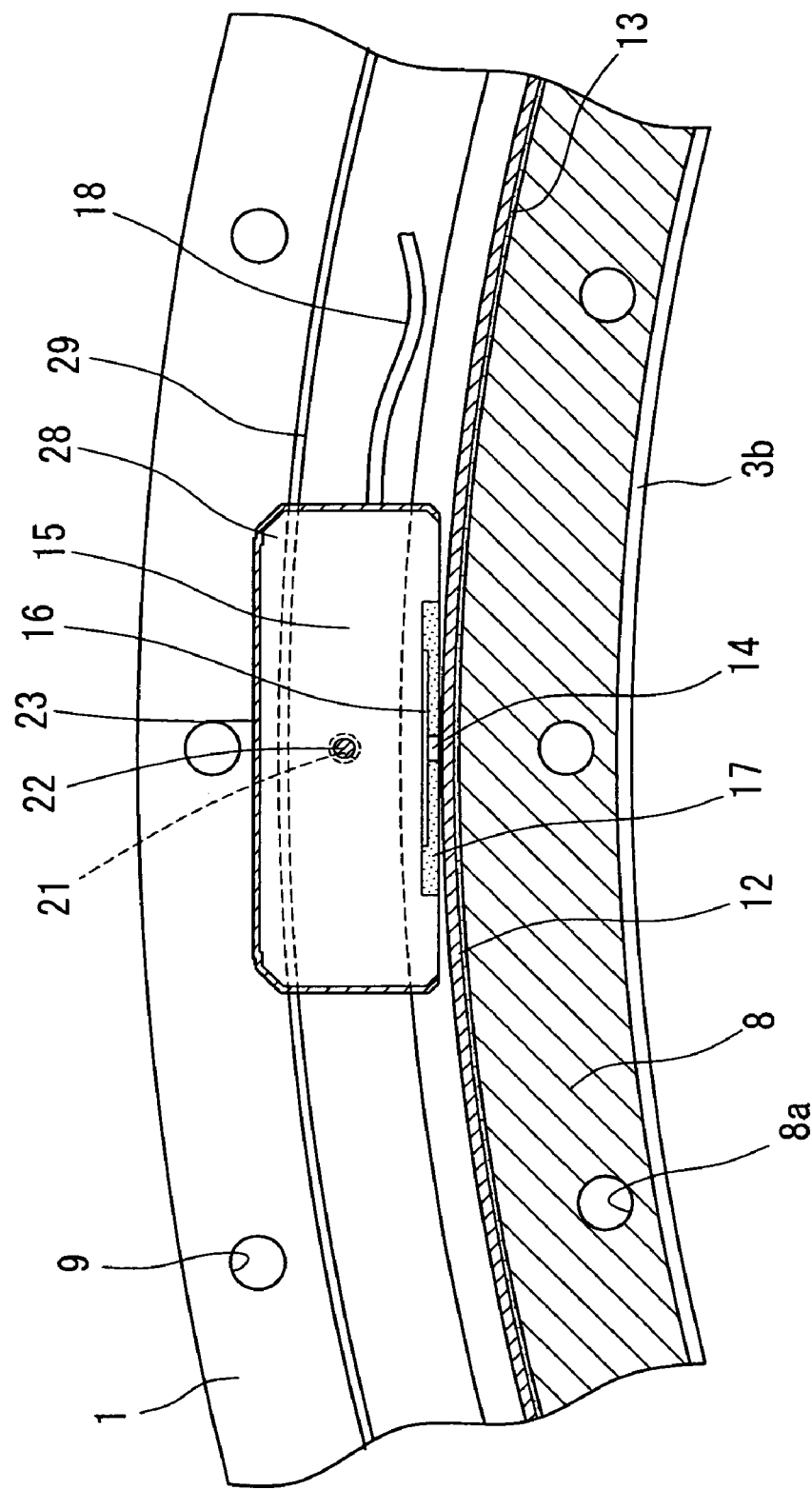
FIG. 12 is a sectional view taken along line XII-XII of FIG. 11.

FIGS. 11 and 12 show a fifth modified example of the first embodiment. The fifth modified example differs from the first embodiment in that the sensor case 15 includes, for its positioning, a flange 28 provided on its side surface and having an arcuate radially inner surface that extends along the radially outer surface of a shoulder 29 of the outer race 1.

Figure 13:
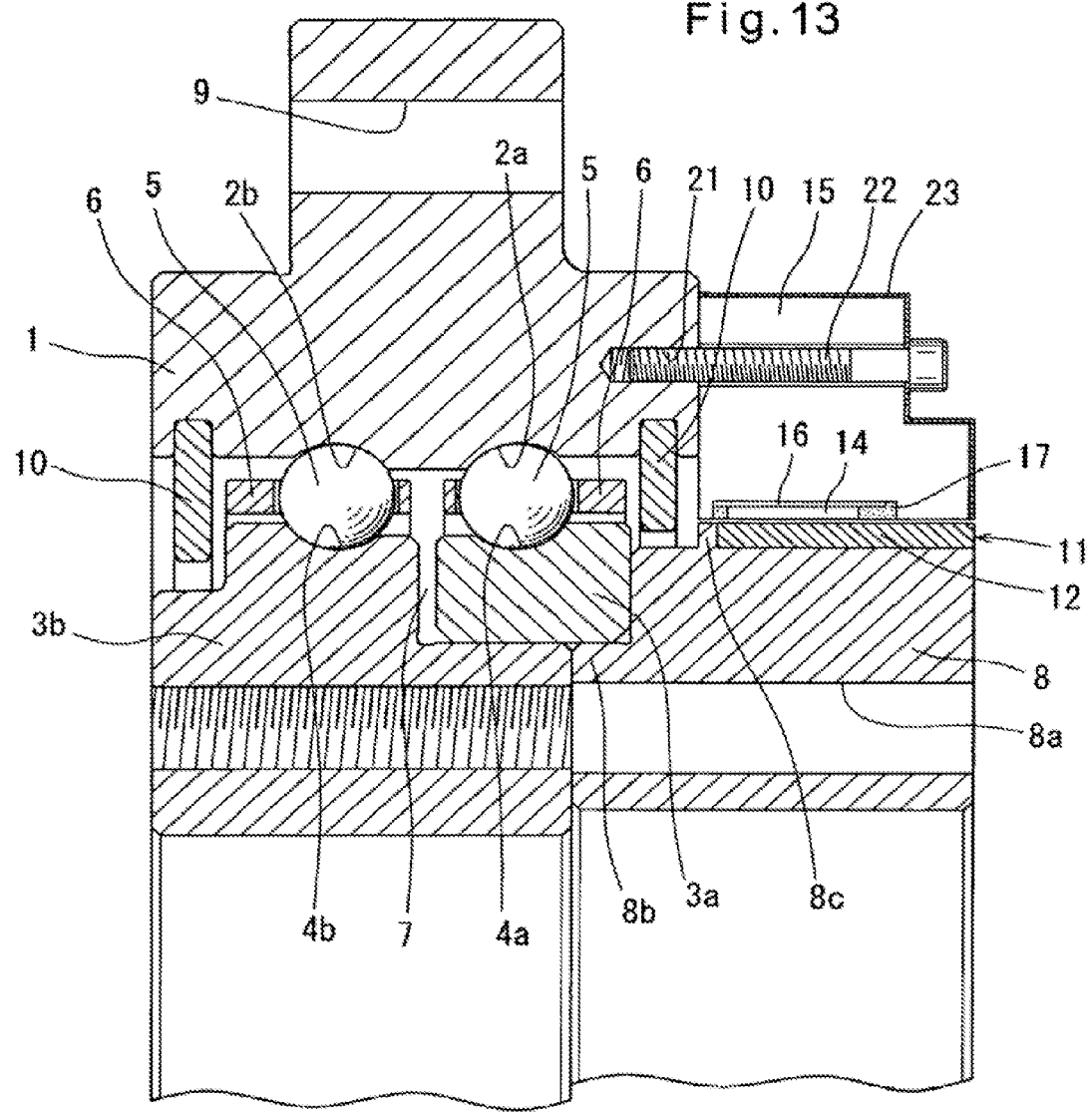
FIG. 13 is a vertical sectional view of a rolling bearing with a rotational speed sensor according to a second embodiment.
Figure 14:
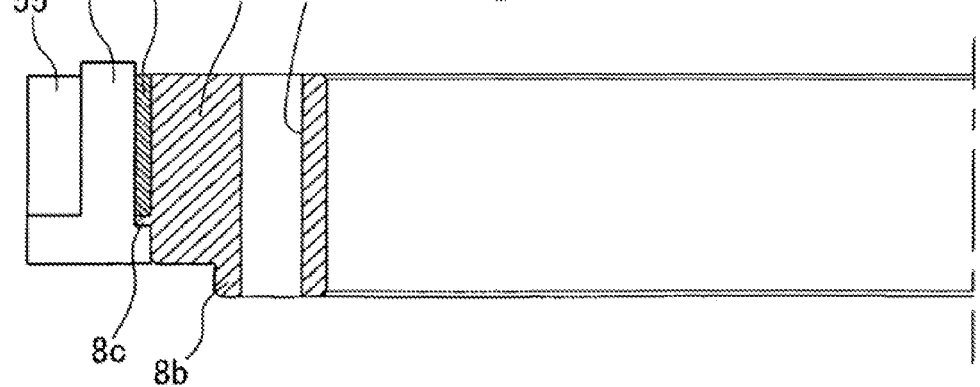
FIG. 14 is a vertical sectional view showing how the magnetic member of FIG. 13 is formed and fixed in position by thermal curing.

FIGS. 13 and 14 show a rolling bearing with a rotational speed sensor according to the second embodiment of the invention. As shown in FIG. 13, it is basically of the same structure as the first embodiment, and differs therefrom in that the magnetic member 12 of the magnetic encoder 11 comprises a magnetic material and a thermosetting resin binding the magnetic material, and is fixed to the outer periphery of the presser member 8, which also serves as the metal core, simultaneously when the magnetic member 12 is formed, and that the flange 8c for axially positioning the magnetic member 12 is provided on the radially outer surface of the presser member 8 near its inner end surface. This makes it possible to manufacture a magnetic encoder 11 having a large diameter at a low cost, because this arrangement needs no large facility for injection molding or a mold and other facilities for vulcanization bonding. The thermosetting resin may be urethane resin or epoxy resin.

Now description is made of how the magnetic encoder 11 is manufactured. As shown in FIG. 14, an annular forming jig 54 is arranged such that a gap is present between the jig and the outer periphery of the presser member 8, which also serves as a metal core, and the raw material 12b for the magnetic member 12, which contains a magnetic material and a thermosetting resin, is placed in this gap. This assembly is placed in a constant temperature bath, and heated to and kept at a predetermined temperature to cure the thermosetting resin, thereby forming the raw material 12b into the magnetic member 12 and simultaneously bonding the magnetic member 12 to the outer periphery of the presser member 8. The forming jig 54 is made of silicone rubber to prevent sticking of the raw material 12b, and has on its outer periphery a permanent magnet 55 for applying a magnetic field to the raw material 12b in the gap to prevent settling of the magnetic material, which has a large specific gravity.

The heating temperature of the raw material 12b is preferably not less than 90° C. and not more than 110° C., more preferably not less than 95° C. and not more than 105° C., and the heating time is preferably not less than two hours and not more than four hours, more preferably not less than 2.5 hours and not more than 3.5 hours. Because the heating temperature of the raw material 12b not very high, the raw material 12b may be heated not in a constant temperature bath but e.g. on a hot plate. The forming jig 54 may be made of fluororubber or fluororesin instead of silicone rubber, or may be made of any other material with a release agent containing fluororubber or fluororesin.

With the magnetic member 12 fixed to the outer periphery of the presser member 8, the magnetic member 12 is magnetized using a separate magnetizing device such that north and south poles are alternately arranged in the circumferential direction. But instead, simultaneously when the raw material 12b is heated, the magnetic member 12 may be magnetized with a magnetizing yoke provided on the outer periphery of the forming jig 54 and around which a magnetizing coil is wound.

Figure 15:
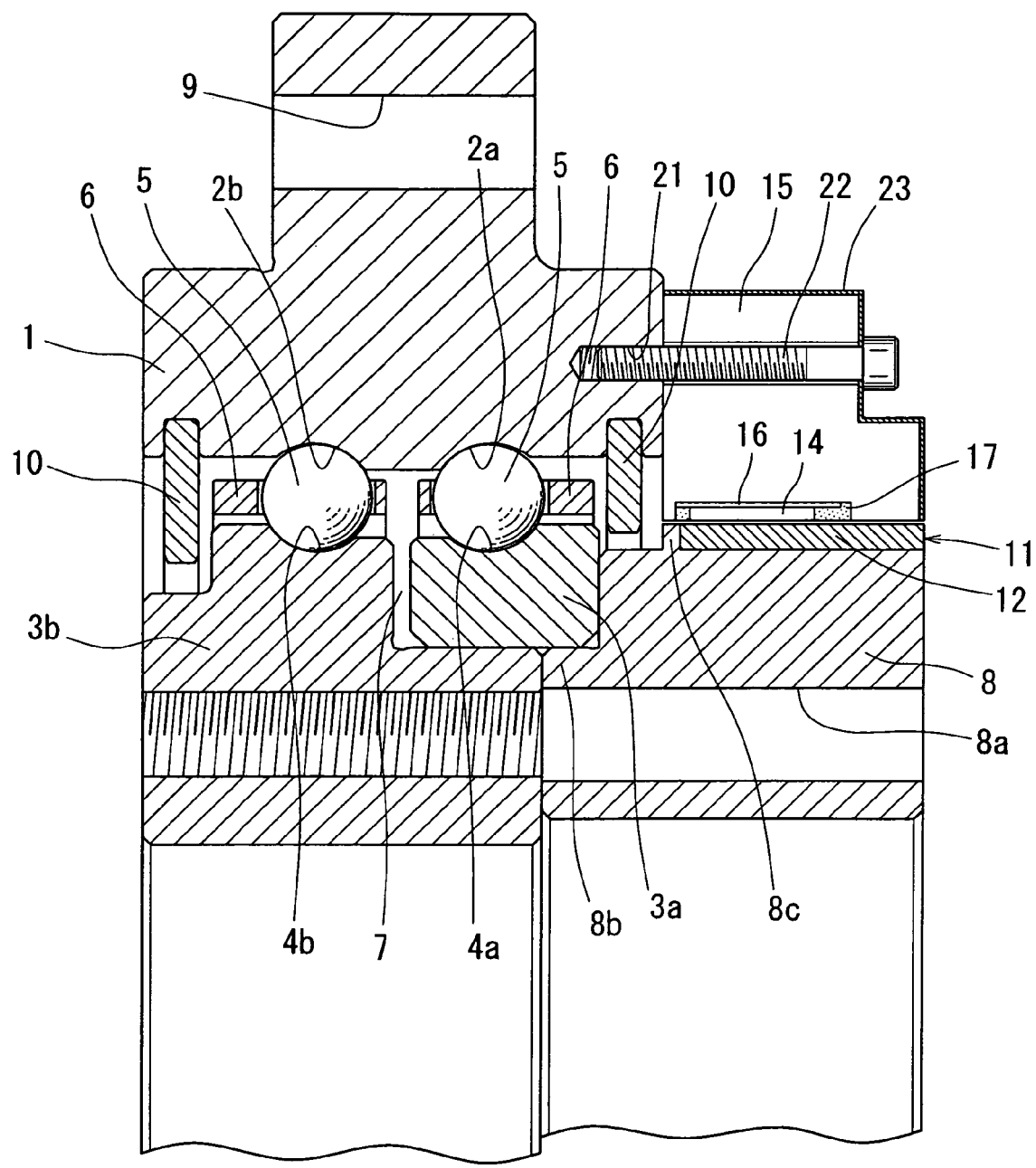
FIG. 15 is a vertical sectional view of a rolling bearing with a rotational speed sensor according to a third embodiment.
Figure 16A:
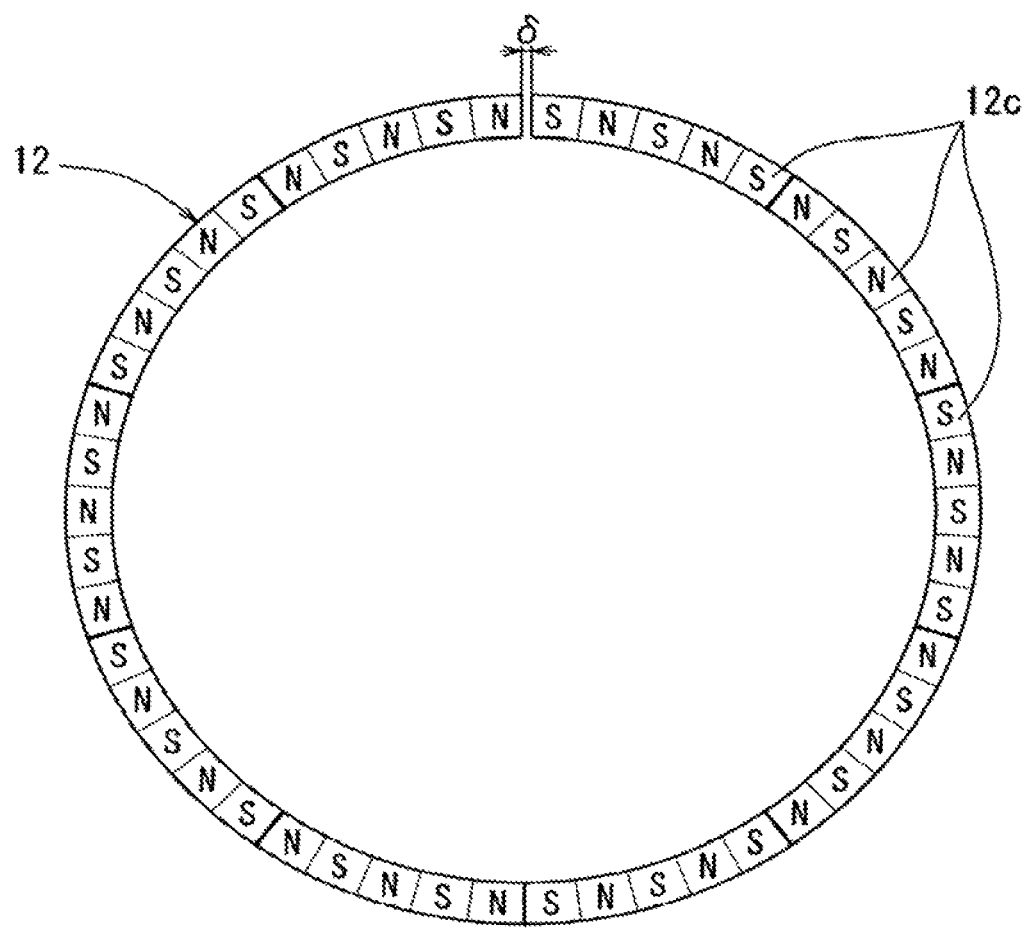
FIG. 16(a) is a schematic side view of the magnetic member of FIG. 15 showing how it is magnetized.
Figure 16B:
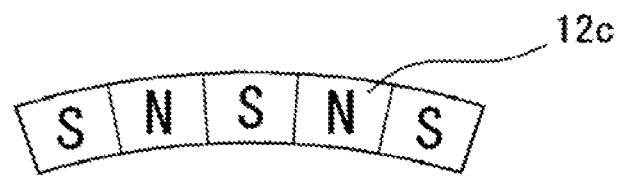
FIG. 16(b) is a schematic side view of a segment of FIG. 16(a).

FIGS. 15 to 17 show a rolling bearing with a rotational speed sensor according to the third embodiment of the invention. As shown in FIG. 15, it is basically of the same structure as the second embodiment, and differs therefrom in that the magnetic member 12 of the magnetic encoder 11 comprises a magnetic material and a thermoplastic resin binding the magnetic material, and that as shown in FIGS. 16(a) and 16(b), the magnetic member 12 comprises a plurality of ($n_S$=10) fan-shaped segments 12c having circumferential lengths equal to each other and individually fixed to the outer periphery of the presser member 8, which also serves as a metal core. The thermoplastic resin may be polyamide or polyphenylene sulfide. Each segment 12c is formed by injection molding. Thus, the individual segments 12c can be formed using a small-sized molds and facilities, which in turn makes it possible to produce a magnetic encoder 11 having a large diameter at a low cost.

The magnetic member 12, which is divided into the ten segments 12c, is adhesively bonded to the outer periphery of the presser member 8 such that any adjacent segments 12c do not overlap with each other and a gap δ is present between a pair of circumferentially adjacent segments 12c. In this state, the magnetic member 12 is magnetized with a magnetizing device such that a total of 50 ($n_P$) magnetic poles are formed with north and south poles arranged alternately with each other in the circumferential direction. Thus, each of the ten segments has five magnetic poles. On both sides of the boundary between any adjacent segments, including the gap δ, different magnetic poles are disposed. The magnetic member 12 may be magnetized separately for the individual segments 12c before being fixed to the presser member 8. The total number $n_P$ of the magnetic poles and the number $n_S$ of the segments 12c can be set to desired values according to e.g. the outer diameter of the magnetic encoder 11. The segments 12c do not have to have circumferential lengths equal to each other. For example, some segments may be formed by further dividing at least one of the segments 12c.

Figure 17A:
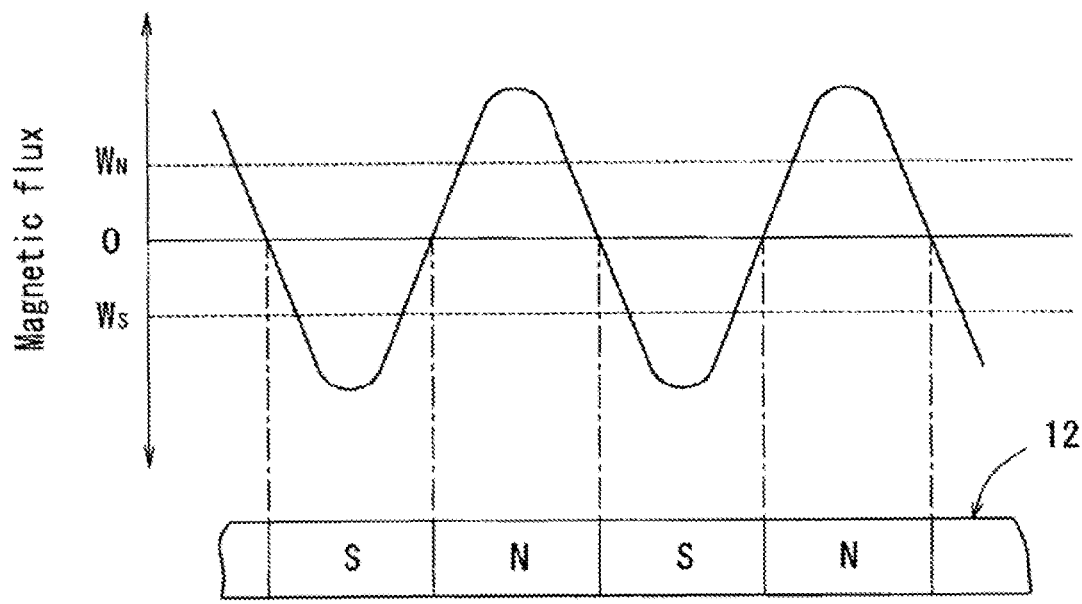
FIG. 17(a) is a graph showing a magnetic waveform detected by the sensor element of FIG. 15.

FIG. 17(a) shows a magnetic waveform produced from the sensor element 14 when the magnetic member 12 of the magnetic encoder 11 rotates together with the inner races 3a and 3b. This magnetic waveform represents change in the magnetic flux between north and south poles when the north and south poles of the magnetic member 12 pass by the sensor element 14. The electric circuit on the substrate 16 detects the revolution of the bearing by counting the number of portions of the waveform that overshoot respective thresholds $W_N$ and $W_S$ of the north and south poles.

Figure 17B:
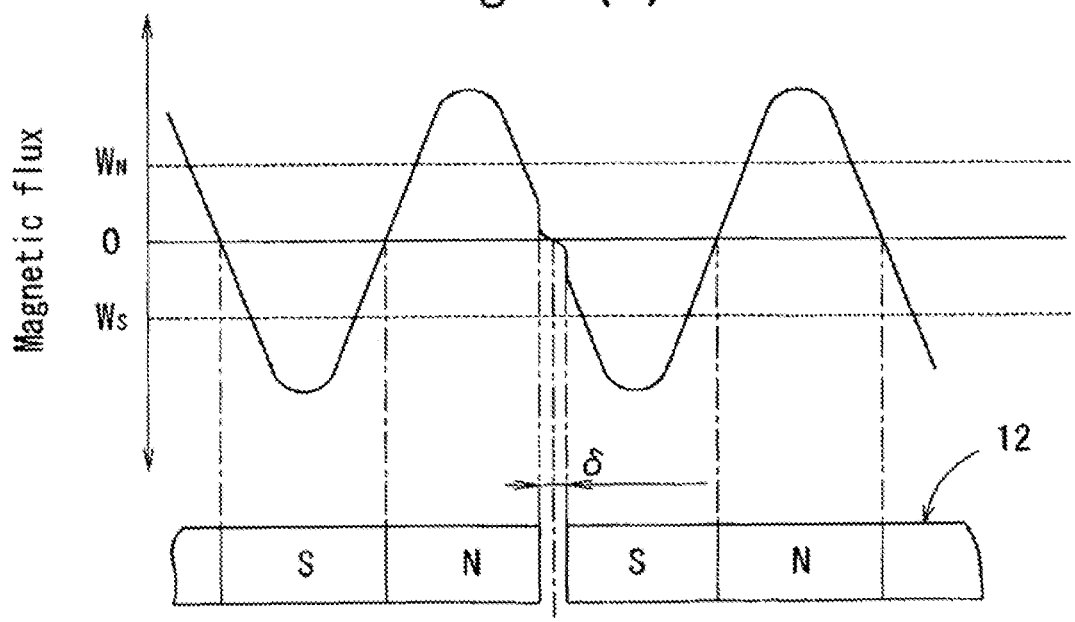
FIG. 17(b) is a graph showing a magnetic waveform at the position of a gap δ shown in FIG. 16(a).

As shown in FIG. 17(b), when the gap δ passes, turbulence occurs in the magnetic waveform. But since the gap δ is provided between a north pole and a south pole, this turbulence occurs between a peak and a trough of the waveform and never overshoots either of the thresholds $W_N$ and $W_S$, so that the electric circuit on the substrate 16 of the sensor element 14 never counts the turbulence. A small turbulence also occurs at the boundary between any other adjacent segments, where no gap is present. But in this case too, because on both sides of such a boundary, different magnetic poles are present, the turbulence occurs between a peak and a trough of the waveform and never overshoots either of the thresholds $W_N$ and $W_S$.

Figure 18:
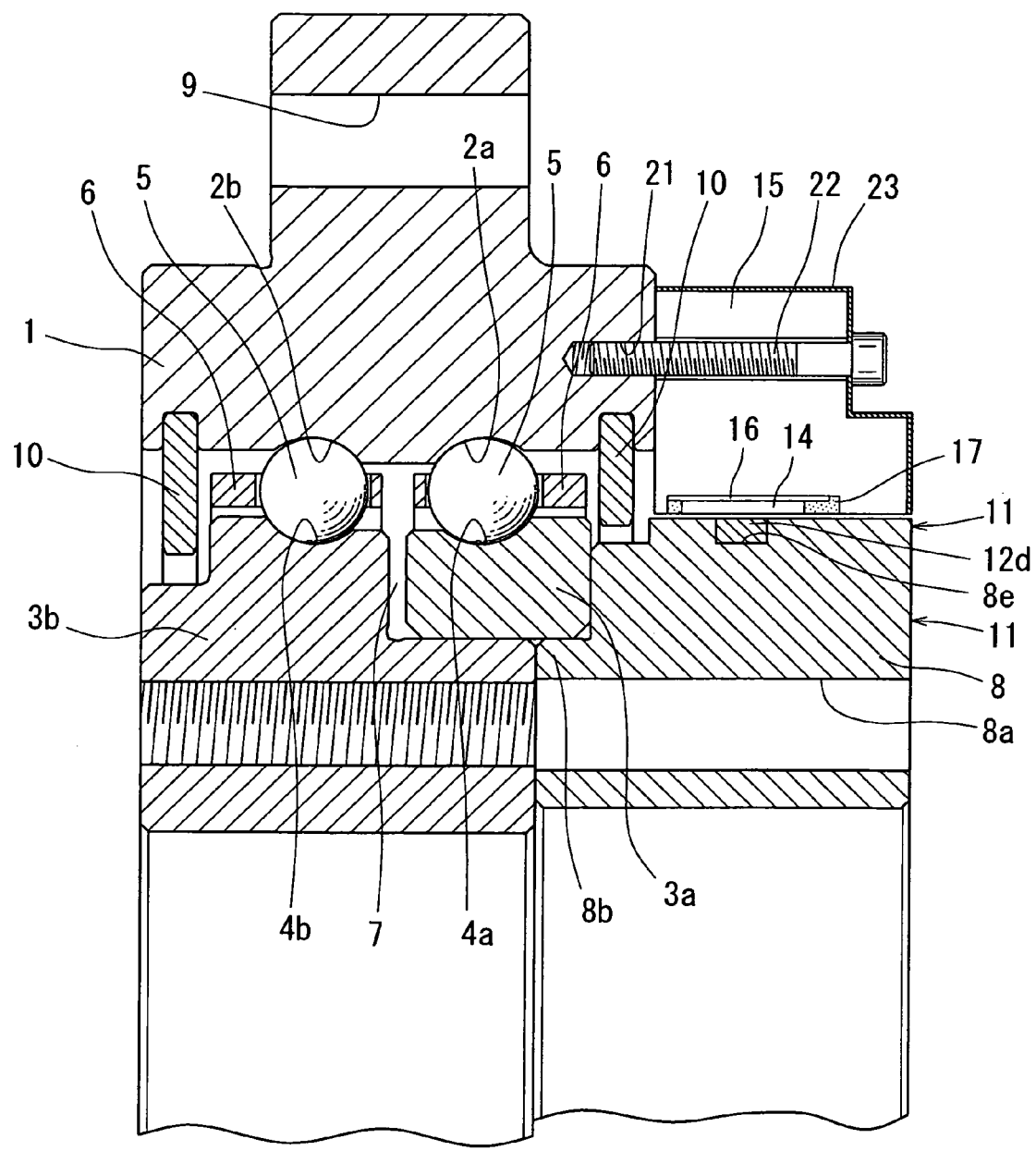
FIG. 18 is a vertical sectional view of a rolling bearing with a rotational speed sensor according to a fourth embodiment.

FIG. 18 shows a rolling bearing with a rotational speed sensor according to the fourth embodiment of the invention. It is basically of the same structure as the first embodiment, and differs therefrom in that an annular groove 8e is formed in the radially outer surface of the presser member 8, and that a magnetic material 12d is received in the annular groove 8e and bonded to the presser member 8 as a base member by thermal spraying, thereby forming the magnetic encoder 11. This eliminates the need for a mold and other facilities for forming or vulcanization bonding, so that it is possible to manufacture even a magnetic encoder 11 with a large outer diameter at a low cost. Also, such bearings can be manufactured even in small lots in a short period of time because it is possible to eliminate the time for forming a mold. The thermal sprayed magnetic material 12d may be a ferrite, whose major component is iron oxide, a rare earth material such as Sm—Co or Nd—Fe—B type, or an Alnico material, whose major components are aluminum, nickel, cobalt and iron. The thermal sprayed magnetic material 12d is magnetized with a magnetizing device such that north and south poles are alternately formed in the circumferential direction.

In any of the embodiments, the rolling bearing is a double row ball bearing of which the inner race is the rotating race, with the magnetic encoder and the sensor element of the rotational speed sensor radially opposed to each other. But the rolling bearing with a rotational speed sensor according to the present invention may be of any other type, such as a single row ball bearing or a roller bearing, or of the type in which the outer race is the rotating race. In the latter case, the magnetic encoder of the rotational speed sensor is mounted to the outer race and the sensor element is mounted to the inner race. The magnetic encoder and the sensor element may be provided so as to be axially opposed each other.

What is claimed is:

1. A rolling bearing with a rotational speed sensor, comprising:
    inner and outer races, one of the inner and outer races being a rotating race and the other of the inner and outer races being a stationary race;
    a magnetic encoder mounted to said rotating race and comprising a metal core and an annular magnetic member fixed to a magnetic member-mounting surface of said metal core, said magnetic member being magnetized such that different magnetic poles are alternately arranged in a circumferential direction thereof; and
    a sensor element mounted to said stationary race for detecting changes in magnetic poles when the magnetic encoder rotates, thereby detecting the rotation of the rotating race;
    wherein said magnetic member comprises a magnetic material and rubber, said rubber binding said magnetic material;
    wherein said magnetic member is fixed to said magnetic member-mounting surface of said metal core by an adhesive; and
    wherein an adhesive-receiving recess is formed in said magnetic member-mounting surface of said metal core to receive the adhesive therein.

2. The rolling bearing of claim 1 wherein said magnetic member is formed by vulcanization in a mold having such a shape that when formed by vulcanization in the mold, said magnetic member is partially bent such that the area enclosed by the magnetic member in the mold is smaller than the area enclosed by the magnetic member when the magnetic member is mounted on the metal core in an annular shape.

3. The rolling bearing of claim 1 wherein said magnetic member is fixed to an outer periphery of said metal core, said magnetic member having an inner circumference, before being fixed to said metal core, that is shorter than the circumference of the outer periphery of said metal core.

4. The rolling bearing of claim 1, wherein
    said adhesive-receiving recess formed in said magnetic member-mounting surface of said metal core has a width smaller than a width of the annular magnetic member.

5. The rolling bearing of claim 4, wherein
    said adhesive is present, between said magnetic member and said magnetic member-mounting surface of said metal core, in said adhesive-receiving recess.

6. The rolling bearing of claim 5, wherein
    said adhesive is further present, between said magnetic member and said magnetic member-mounting surface of said metal core, where said adhesive-receiving recess is not formed.

7. The rolling bearing of claim 1, wherein
    said magnetic member-mounting surface of said metal core faces said annular magnetic member in a radial direction of said annular magnetic member and said rolling bearing.

8. The rolling bearing of claim 7, wherein
    said adhesive-receiving recess formed in said magnetic member-mounting surface of said metal core has a width smaller than a width of the annular magnetic member.

9. The rolling bearing of claim 8, wherein
    said adhesive is present, between said magnetic member and said magnetic member-mounting surface of said metal core, in said adhesive-receiving recess.

10. The rolling bearing of claim 9, wherein
    said adhesive is further present, between said magnetic member and said magnetic member-mounting surface of said metal core, where said adhesive-receiving recess is not formed.

* * * * *